(12) United States Patent
Kurata

(10) Patent No.: US 11,698,838 B1
(45) Date of Patent: Jul. 11, 2023

(54) DATA STORAGE VOLUME RE-BIND METHOD

(71) Applicant: Hitachi, Ltd., Tokyo (JP)

(72) Inventor: Naruki Kurata, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/589,695

(22) Filed: Jan. 31, 2022

(51) Int. Cl.
 *G06F 12/00* (2006.01)
 *G06F 11/14* (2006.01)
 *G06F 3/06* (2006.01)

(52) U.S. Cl.
 CPC .......... *G06F 11/1469* (2013.01); *G06F 3/065* (2013.01); *G06F 3/067* (2013.01); *G06F 3/0614* (2013.01); *G06F 3/0644* (2013.01)

(58) Field of Classification Search
 CPC .. G06F 11/1469; G06F 3/0614; G06F 3/0644; G06F 3/065; G06F 3/067; G06F 3/0665; G06F 3/0683
 See application file for complete search history.

(56) References Cited

U.S. PATENT DOCUMENTS 8,650,566 B2 * 2/2014 Vaghani ................ G06F 3/0617
 718/1

* cited by examiner

*Primary Examiner* — Shawn X Gu
(74) *Attorney, Agent, or Firm* — Procopio, Cory, Hargreaves & Savitch LLP

(57) ABSTRACT

Disclosed herein is a technique to automatically re-bind applications and storage volumes during recovery from planned outage or platform failure and disaster recovery. Such implementations can involve managing volume management information that maps volume claim information with a logical volume identifier associated with persistent volume information; and for receipt of a request for a new volume, referencing the volume management information to retrieve an associated logical volume identifier and the persistent volume information based on the volume claim information associated with the request; and providing the retrieved persistent volume information to a volume provisioning function.

9 Claims, 16 Drawing Sheets

| Claim Name | LV ID | PV Name | PV attributes |
|---|---|---|---|
| volumeForApp1 | 1 | pvc-f6651d... | protocol: iSCSI, ... |
| volumeForApp2 | 2 | pvc-de9af4... | ... |
| volumeForApp3 | 3 | pvc-67dfe3... | ... |

| Claim Name | LV ID | PV Name | PV attributes |
|---|---|---|---|
| volumeForApp1 | 1 | pvc-f6651d... | protocol: iSCSI, ... |
| volumeForApp2 | 2 | pvc-de9af4... | ... |
| volumeForApp3 | 3 | pvc-67dfe3... | ... |

FIG. 4

DATA STORAGE VOLUME RE-BIND METHOD

BACKGROUND

Field

The present disclosure is generally directed to storage systems, and more specifically, to rebinding of storage volumes and containers in storage systems.

Related Art

In order to improve the reproducibility and reusability of Information Technology (IT) services, operations using declarative Infrastructure as Code (IaC) and GitOps have emerged. In declarative IaC, a user describes a desired state of the services as manifests, and an orchestrator of the infrastructure reconciles it with the actual state of the services and modifies them if needed. Therefore, the user does not need to describe the procedure of the operation and improve reusability. In addition, the manifests described as the declarative IaC can be stored in a highly available repository (e.g. git repository) as a single source of truth. Such implementations make it possible to quickly reproduce services by redeploying the manifests from the repository, even if the states of the IT services are lost.

Further, in container orchestration environments such as Kubernetes, it is common to provision storage volumes using a method called dynamic provisioning. In dynamic provisioning, a user claims a volume configuration as a desired state, and the storage driver dynamically creates a corresponding volume and maps the volume to the claim. Thus, the user can use a storage volume without support from the storage administrator.

In a related art implementation, metadata of the container orchestration environment and volume data are subject to back up processes. Such related art implementations restore the data after restarting the cluster to reproduce the state before the planned shutdown or failure of the environment. However, such a related art technique reverts to the state according to the frequency of backups so that it cannot reproduce the environment just before the shutdown.

SUMMARY

In the event of a planned outage or failure of a container orchestration environment, there is an expectation to have the capability to recreate the same environment as before the outage after the recovery. However, if the environment was created using related operations, when the cluster is recovered from the outage, the manifests are redeployed from the repository. Then, dynamic provisioning is performed as in the initial setup, and new volumes will be created and mapped to the volume claims instead of the existing volumes. This is because the mapping information between the dynamically created volumes and the declaratively described volume claims has been lost during the restoration of the environment.

Aspects of the present disclosure can involve a method, which can involve managing volume management information that maps volume claim information with a logical volume identifier associated with persistent volume information; and for receipt of a request for a new volume, referencing the volume management information to retrieve an associated logical volume identifier and the persistent volume information based on the volume claim information associated with the request; and providing the retrieved persistent volume information to a volume provisioning function.

Aspects of the present disclosure can involve a computer program, storing instructions which can involve managing volume management information that maps volume claim information with a logical volume identifier associated with persistent volume information; and for receipt of a request for a new volume, referencing the volume management information to retrieve an associated logical volume identifier and the persistent volume information based on the volume claim information associated with the request; and providing the retrieved persistent volume information to a volume provisioning function. The computer program and instructions can be stored on a non-transitory computer readable medium to be executed by one or more processors.

Aspects of the present disclosure can involve a system which can involve means for managing volume management information that maps volume claim information with a logical volume identifier associated with persistent volume information; and for receipt of a request for a new volume, means for referencing the volume management information to retrieve an associated logical volume identifier and the persistent volume information based on the volume claim information associated with the request; and means for providing the retrieved persistent volume information to a volume provisioning function.

Aspects of the present disclosure can involve an apparatus, which can involve a processor, configured to manage volume management information that maps volume claim information with a logical volume identifier associated with persistent volume information; and for receipt of a request for a new volume, reference the volume management information to retrieve an associated logical volume identifier and the persistent volume information based on the volume claim information associated with the request; and provide the retrieved persistent volume information to a volume provisioning function.

Aspects of the present disclosure can involve a method which can include managing volume management information that maps volume claim information with a logical volume identifier associated with persistent volume information; and for receipt of a request for a new volume, providing temporary persistent volume information to a volume provisioning function.

Aspects of the present disclosure can involve a computer program which can involve instructions which can include managing volume management information that maps volume claim information with a logical volume identifier associated with persistent volume information; and for receipt of a request for a new volume, providing temporary persistent volume information to a volume provisioning function. The computer program and instructions can be stored in a non-transitory computer readable medium and executed by one or more processors.

Aspects of the present disclosure can involve a system which can include means for managing volume management information that maps volume claim information with a logical volume identifier associated with persistent volume information; and for receipt of a request for a new volume, means for providing temporary persistent volume information to a volume provisioning function.

Aspects of the present disclosure can involve an apparatus, which can include a processor, configured to manage volume management information that maps volume claim information with a logical volume identifier associated with persistent volume information; and for receipt of a request for a new volume, provide temporary persistent volume information to a volume provisioning function.

Aspects of the present disclosure can involve a method, which can involve managing volume management information that maps volume claim information with a logical volume identifier associated with persistent volume information; and generating a persistent volume metadata using the logical volume identifier and the persistent volume information in the volume management information prior to the receipt of a request for a new volume.

Aspects of the present disclosure can involve a computer program, which can involve instructions for managing volume management information that maps volume claim information with a logical volume identifier associated with persistent volume information; and generating a persistent volume metadata using the logical volume identifier and the persistent volume information in the volume management information prior to the receipt of a request for a new volume. The computer program and instructions can be stored in a non-transitory computer readable medium and executed by one or more processors.

Aspects of the present disclosure can involve a system, which can involve means for managing volume management information that maps volume claim information with a logical volume identifier associated with persistent volume information; and means for generating a persistent volume metadata using the logical volume identifier and the persistent volume information in the volume management information prior to the receipt of a request for a new volume.

Aspects of the present disclosure can involve an apparatus, which can involve a processor configured to manage volume management information that maps volume claim information with a logical volume identifier associated with persistent volume information; and generate a persistent volume metadata using the logical volume identifier and the persistent volume information in the volume management information prior to the receipt of a request for a new volume.

BRIEF DESCRIPTION OF DRAWINGS

FIG. 4 illustrates a Volume Mapping Table, in accordance with an example implementation.

DETAILED DESCRIPTION

Figure 1:
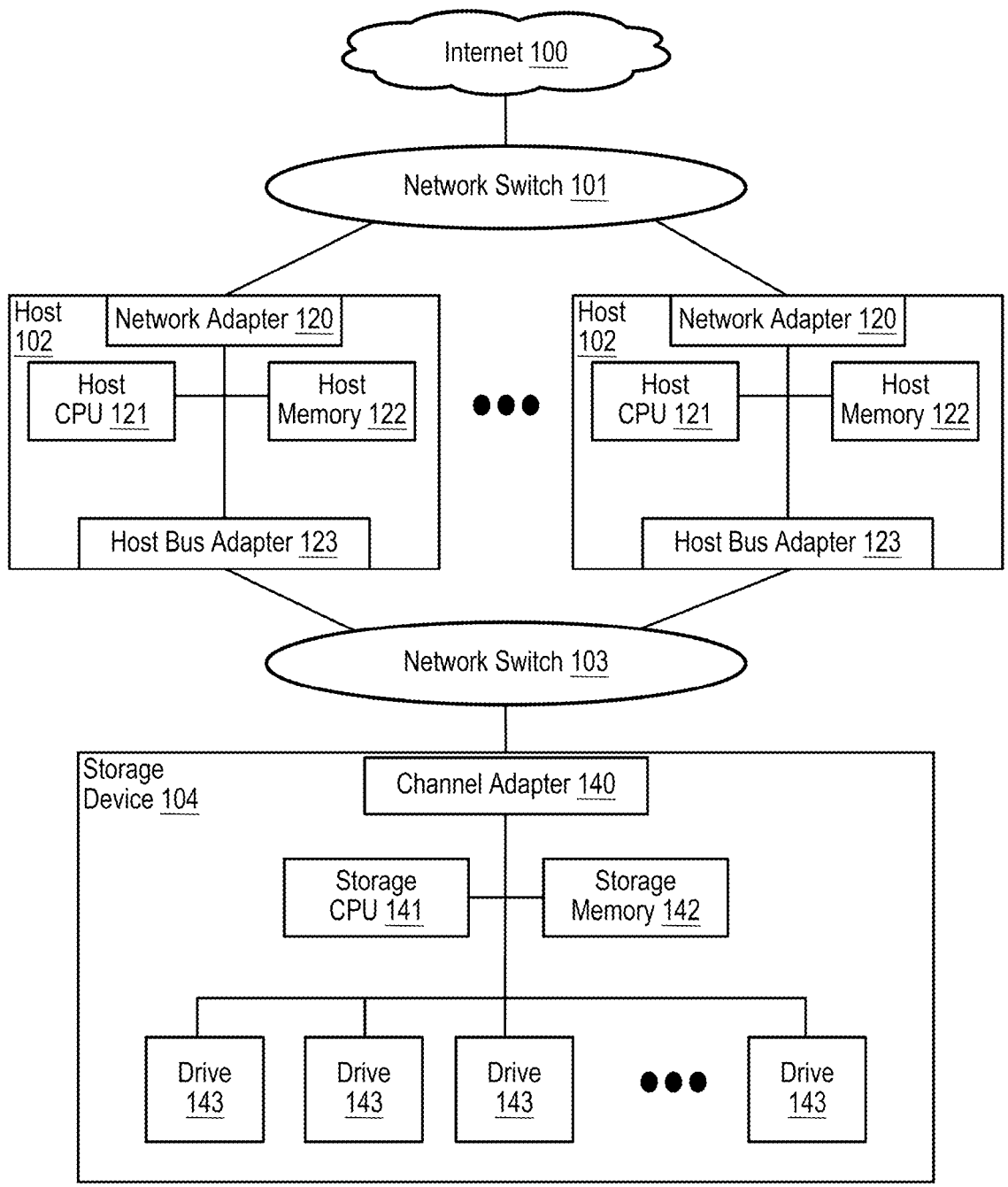
FIG. 1 illustrates an overview of a computer system, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates an overview of a computer system, in accordance with an example implementation. The computer system can involve one or more hosts 102, one or more network switches 101, 103 and a storage device 104.

Each host 102 can involve a host central processing unit (CPU) 121, a host memory 122, a network adapter 120 and a host bus adapter 123. The host memory 122 includes an area where user programs, user data, container orchestrator programs, and container orchestrator data that are used by the host CPU 121. The host memory 122 can be volatile medium or non-volatile medium depending on the desired implementation. The hosts 102 can communicate with each other through the network adapter 120 via a host network switch 101 and with the storage device 104 through the host bus adapter 123 via a storage network switch 103. In the example implementation of FIG. 1, the hosts 121 can access to the Internet 100 through the network adapter via the host network switch 101.

The storage device 104 involves a channel adapter 140, a storage CPU 141, a storage memory 142 and one or more drives 143. The channel adapter 140 is an interface that communicates with the hosts 102 via the switch 103. The storage memory 142 includes an area in which programs and metadata are used by the storage CPU 141 to control the storage, and a cache memory area where data is temporarily stored. The storage memory 142 can be volatile medium or non-volatile medium depending on the desired implementation.

In the example implementations described herein, the network 101 that connects hosts 102 and the network 103 that connects the hosts 102 and the storage device 104 are physically separated, but the networks can be logically separated networks by using the desired implementation (e.g. virtual logical area network (VLAN)), or can be the same network depending on the desired implementation.

Figure 2:
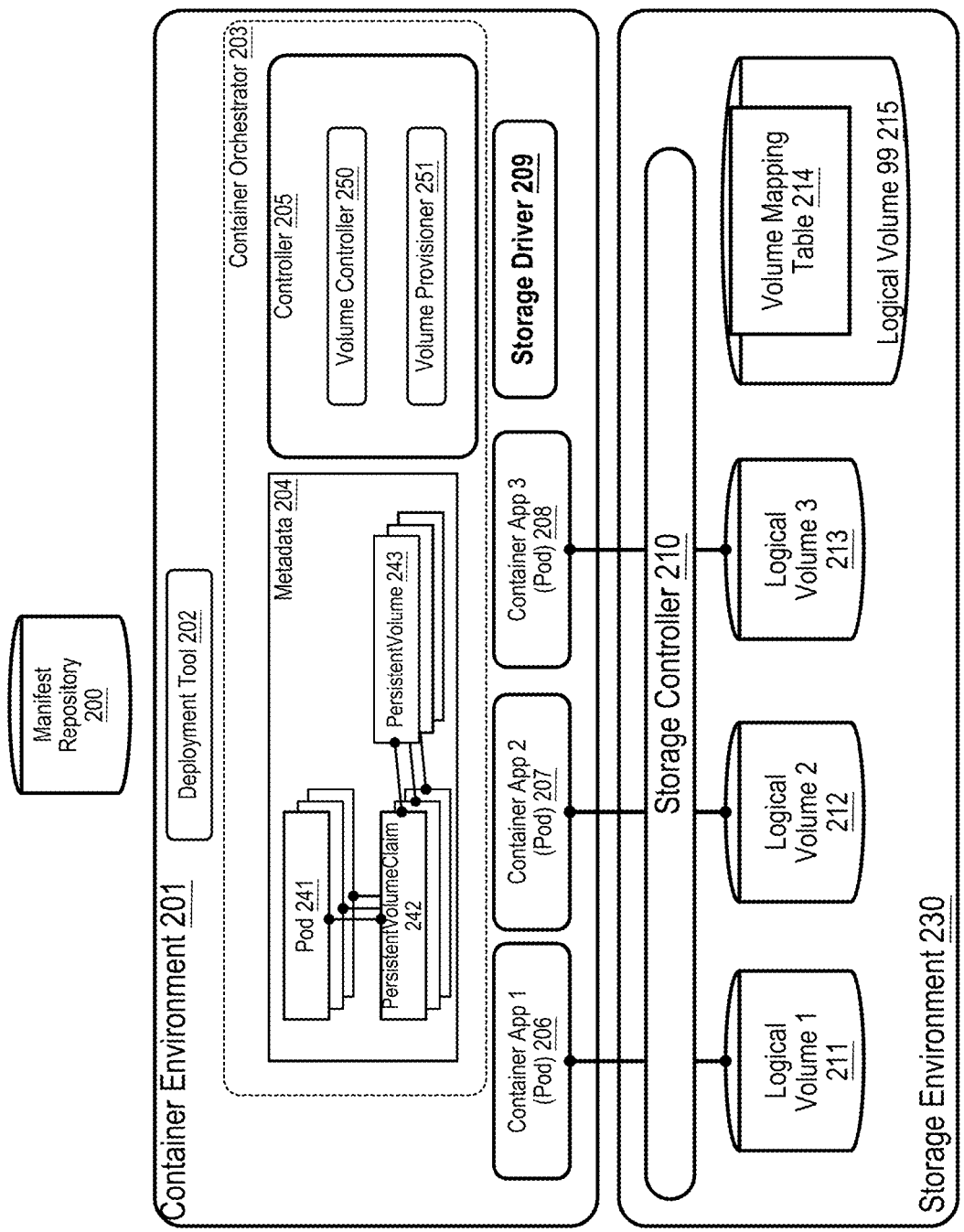
FIG. 2 illustrates a logical configuration of the system, in accordance with an example implementation.

FIG. 2 illustrates a logical configuration of the system, in accordance with an example implementation. In this example implementation, a container environment 201 is established among the hosts 102 and a storage environment 230 is established in the storage device 104 shown in FIG. 1 respectively.

In the container environment 201, there is a container orchestrator 203 that manages users container applications and their corresponding information, and user programs which include containers.

The container orchestrator 203 includes the metadata 204 and the controller program, which are placed on the host memory 122. The metadata 204 can include the desired state of the user and the current state of the services in the container environment. In the example implementation of FIG. 2, the metadata 204 includes Pod information 241 which describes the user container applications, PersistentVolumeClaim information 242 which describes user claims for storage volumes, and PersistentVolume information 243 which describes actual storage volumes that can be used in the container environment 201.

The controller 205 can include a program, which is executed by CPUs 121 by hosts 102, and reconciles the desired state of the user and the current state, which are described by the metadata 204, and modifies the current state if needed. In the example implementation of FIG. 2, the controller program includes a volume controller 250 which manages PersistentVolumeClaim 242 and PersistentVolume 243 metadata, and a volume provisioner 251 which creates a new volume depending on the PersistentVolumeClaim metadata 242 specified by the user.

In the example implementation of FIG. 2, the user programs include a deployment tool 202, a storage driver 209 and container applications 206, 207, 208. These programs are placed on host memory 122 and executed by host CPUs 121.

The deployment tool 202 can deploy manifests associated with user desired states from a manifest repository to the container environment as the container orchestrator metadata. The manifest repository 200 can be placed in a managed service in the Internet such as GitHub or by other methods in accordance with the desired implementation.

The storage driver 209 can handle the storage environment operation such as volume creation from the container environment through the API.

The container applications are the components of the services that the user originally intended to deploy to the container environment. In the example implementations, three Pods (container applications) 206, 207, 208 are deployed, however, the number of pods can be more or less depending on the desired implementation, and the present disclosure is not limited thereto.

In the storage environment 230, programs including the storage controller 210 are placed on the storage memory 142 and executed by storage CPU 141. Each logical volume 211, 212, 213 can be part of drives 143 in the storage device 104 and accessed by the respective pod in the container environment. In the example implementations described herein, the storage environment 230 provides the logical volume 1 211 to the container application 1 206, the logical volume 2 212 to the container application 2 207, and the logical volume 3 213 to the container application 3 208, respectively. A volume mapping table 214 is a table that stores mapping information of a logical volume and PersistentVolumeClaim. The volume mapping table 214 can be stored in a respective logical volume. In the example implementations described herein, the volume mapping table is stored in the logical volume 99 215, but can be stored in other logical volumes in accordance with the desired implementation. Depending on the desired implementation, the storage environment 230 can be storage outside container environment or storage deployed within container environment. Depending on the desired implementation, volume mapping table 214 can be stored in external storage or in an external database instead of the storage environment 230, or can be stored in container based storage (deployed within container environment) depending on the desired implementation.

Figure 3:
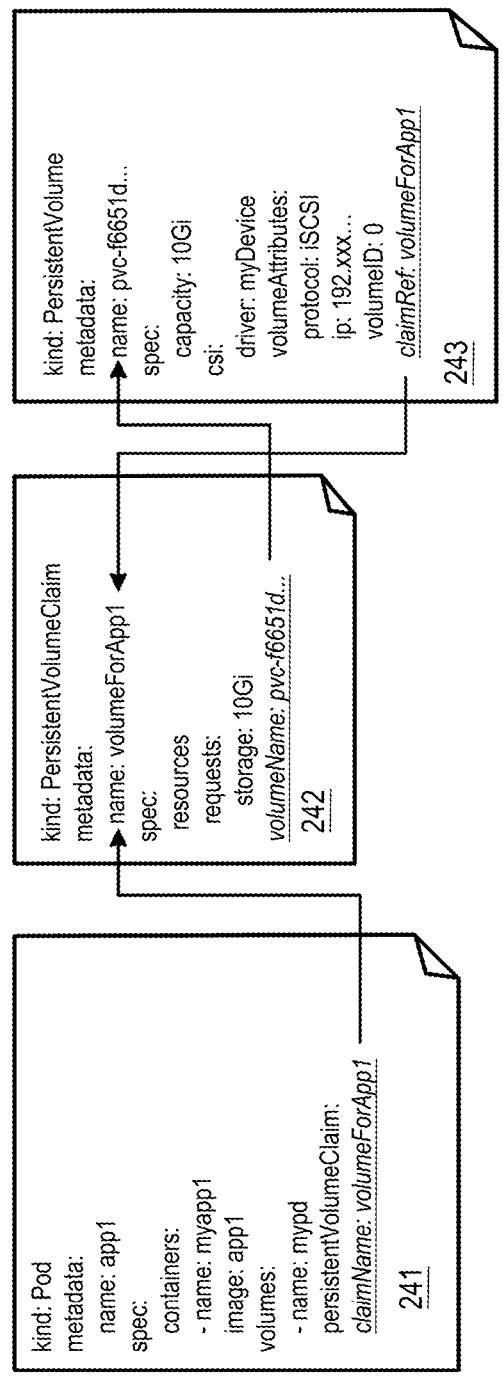
FIG. 3 illustrates example details of orchestrator metadata from FIG. 2, in accordance with an example implementation.
Figure 5:
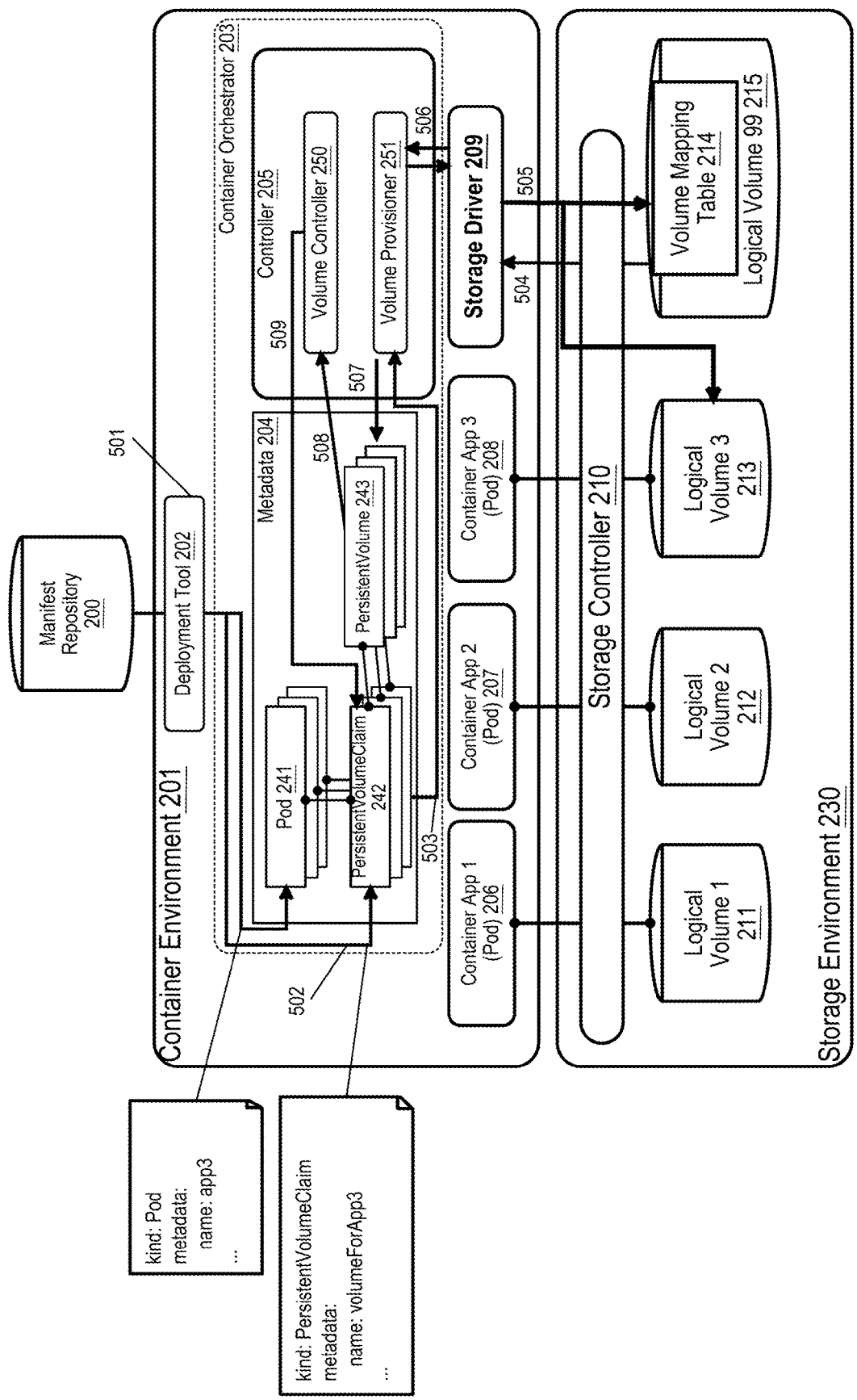
FIG. 5 describes an overall procedure of an initial deployment of the container application and corresponding volume using dynamic provisioning.
Figure 7:
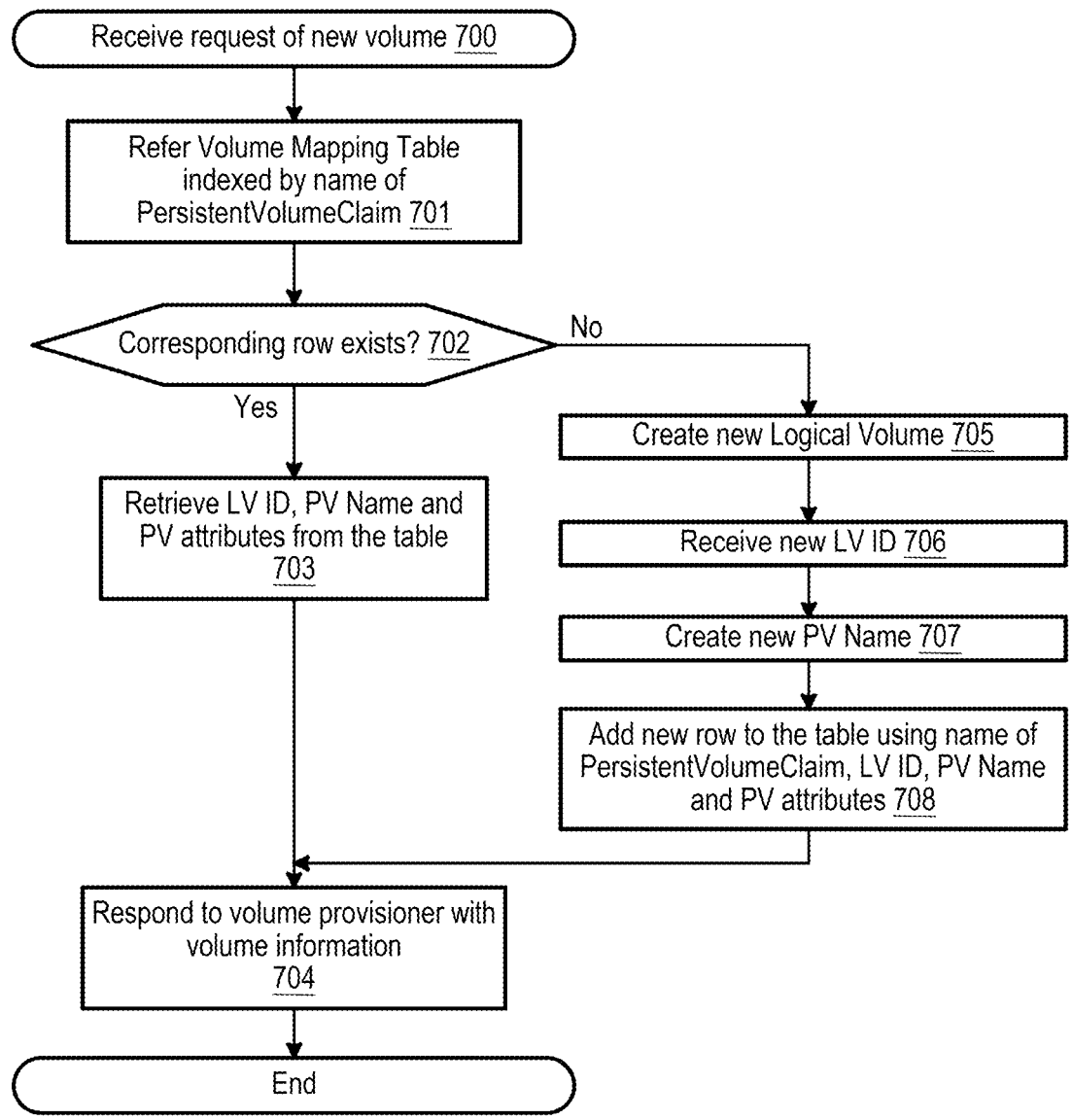
FIG. 7 illustrates a flowchart when the storage driver is requested a new volume from the volume provisioner, in accordance with an example implementation.

In a first aspect, CPUs 121 can execute a method or computer instructions involving managing volume management information that maps volume claim information with a logical volume identifier associated with persistent volume information as illustrated in FIG. 3; and for receipt of a request for a new volume, referencing the volume management information to retrieve an associated logical volume identifier and the persistent volume information based on the volume claim information associated with the request; and providing the retrieved persistent volume information to a volume provisioning function as illustrated in FIGS. 4, 5, and 7. The persistent volume information can also include the logical volume identifier, depending on the desired implementation.

In a second aspect, CPUs 121 can execute the method or computer instruction involving the referencing the volume management information to retrieve an associated logical volume identifier and the persistent volume information based on the volume claim information associated with the request from the first aspect, by determining whether a corresponding data exists in the volume management information associated with a claim name from the persistent volume information; and for a determination that the corresponding data exists, retrieving the associated persistent volume information comprising persistent volume identifier and persistent volume attributes, from the volume management information as illustrated in FIG. 7 from 700-704. The corresponding data can be based on a corresponding row as described herein, however, the volume management information is not limited to the table structure and corresponding data can be retrieved in accordance with the desired data structure and implementation. The persistent volume name can serve as the persistent volume identifier.

In a third aspect, CPUs 121 can execute the method or instructions for the referencing the volume management information to retrieve an associated logical volume identifier and the persistent volume information based on the volume claim information associated with the request of any of the above aspects, by determining whether a corresponding data exists in the volume management information associated with a claim name from the persistent volume information; for a determination that the corresponding data does not exist, creating a new logical volume with a new logical volume identifier; creating a new persistent volume identifier based on the new logical volume and the new logical volume identifier; and adding a new data to the volume management information comprising the new logical volume identifier as illustrated in FIG. 7, 705-708.

Figure 8:
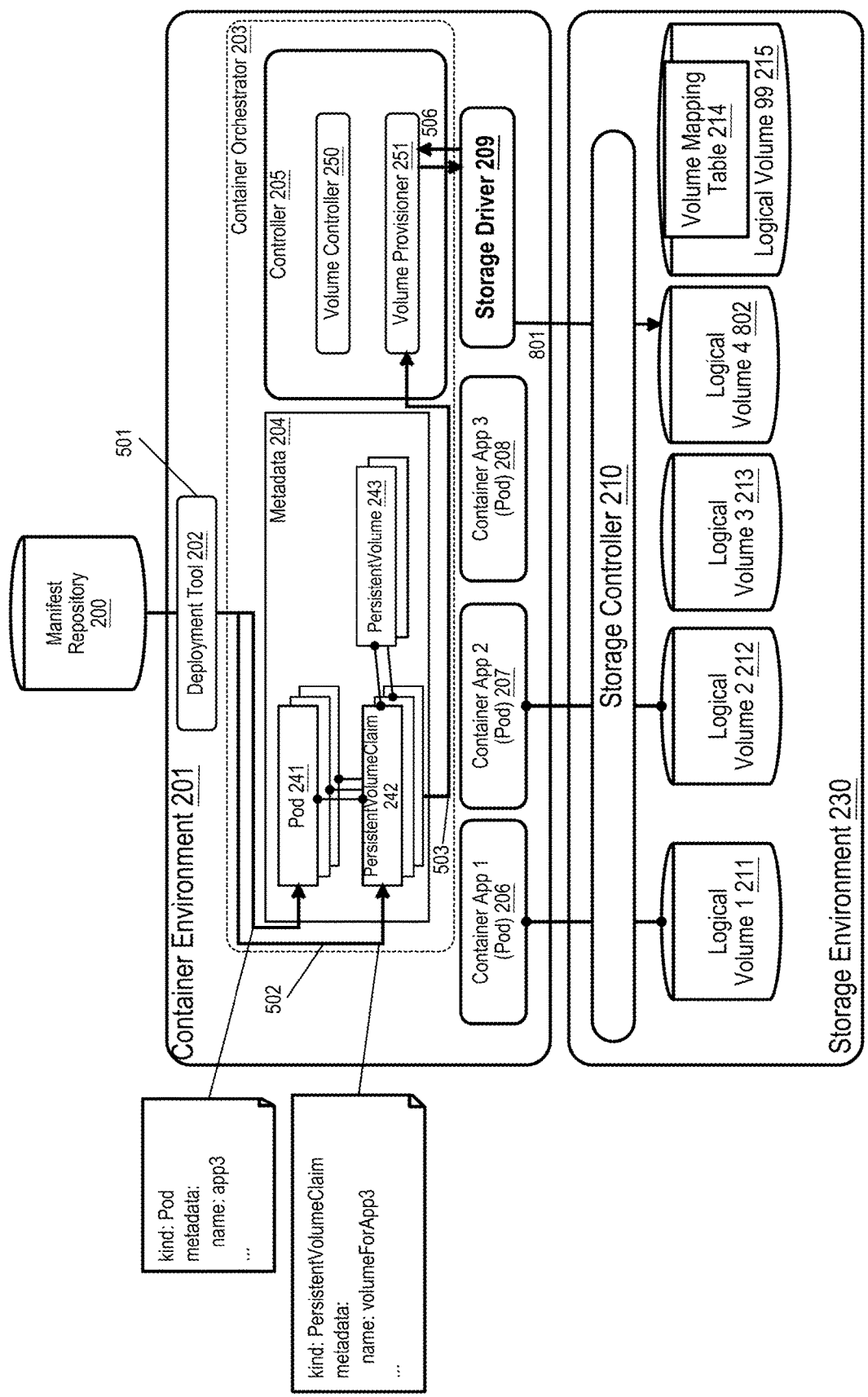
FIG. 8 illustrates the first half of an example of overwriting PersistentVolume information, in accordance with an example implementation.
Figure 9:
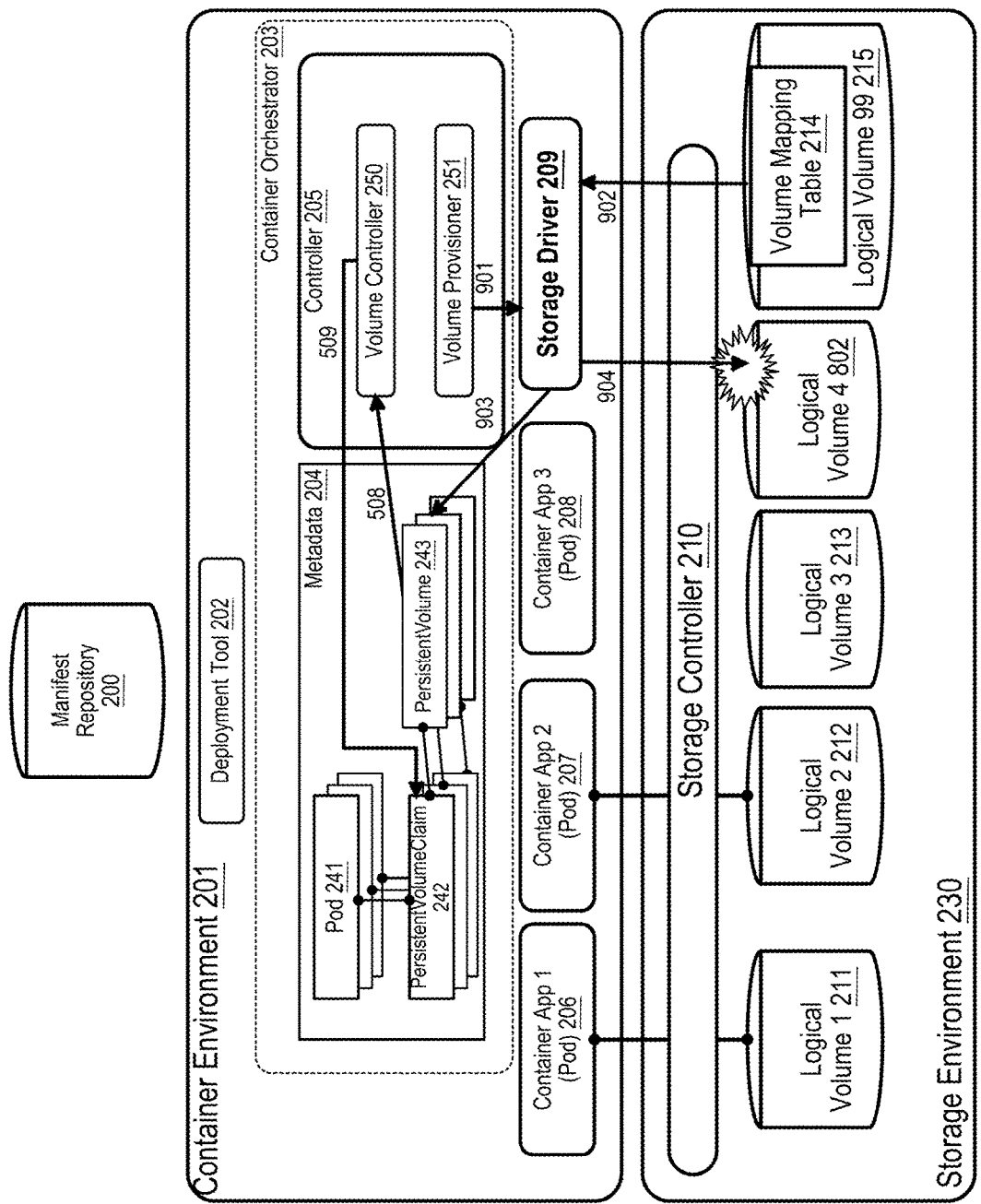
FIG. 9 illustrates the second half of an example of overwriting PersistentVolume information, in accordance with an example implementation.

In a fourth aspect, CPUs 121 can execute the method or instructions of any of the preceding aspects, and further involve, for the volume provisioning function creating the new persistent volume metadata responsive to the retrieved persistent volume information, during a binding of a persistent volume claim to the new persistent volume metadata: executing a hook process to determine whether a corresponding data exists in the volume management information associated with the claim name from the persistent volume information; for a determination that the corresponding data exists, retrieving the associated logical volume identifier and the persistent volume information comprising persistent volume identifier and persistent volume attributes, from the volume management information; and overwriting the persistent volume metadata attributes with the retrieved persistent volume attributes in the volume management information as illustrated in FIG. 8 and FIG. 9.

Figure 10:
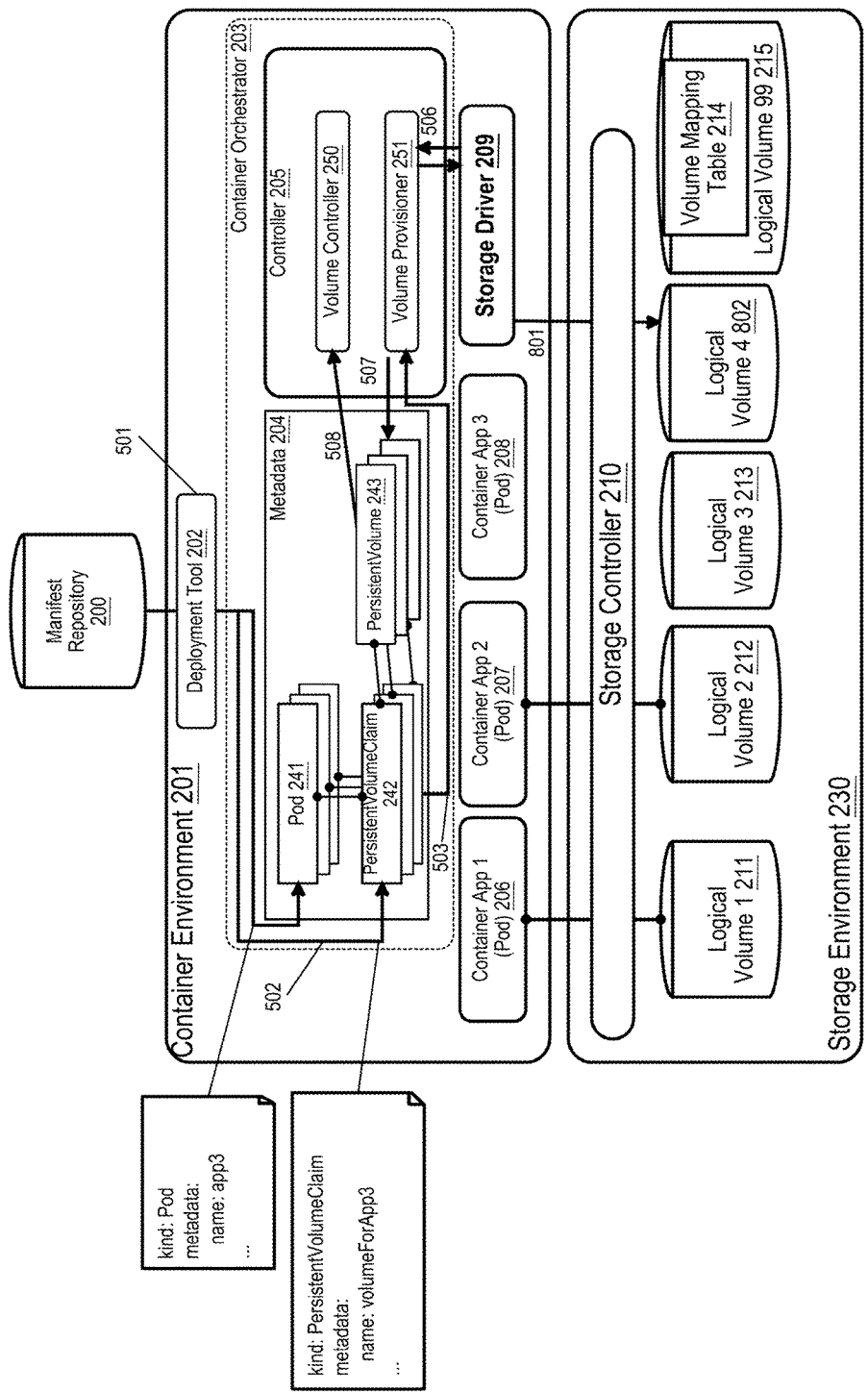
FIG. 10 illustrates the first half of examples of copying volume metadata and copying data, in accordance with example implementations.
Figure 11:
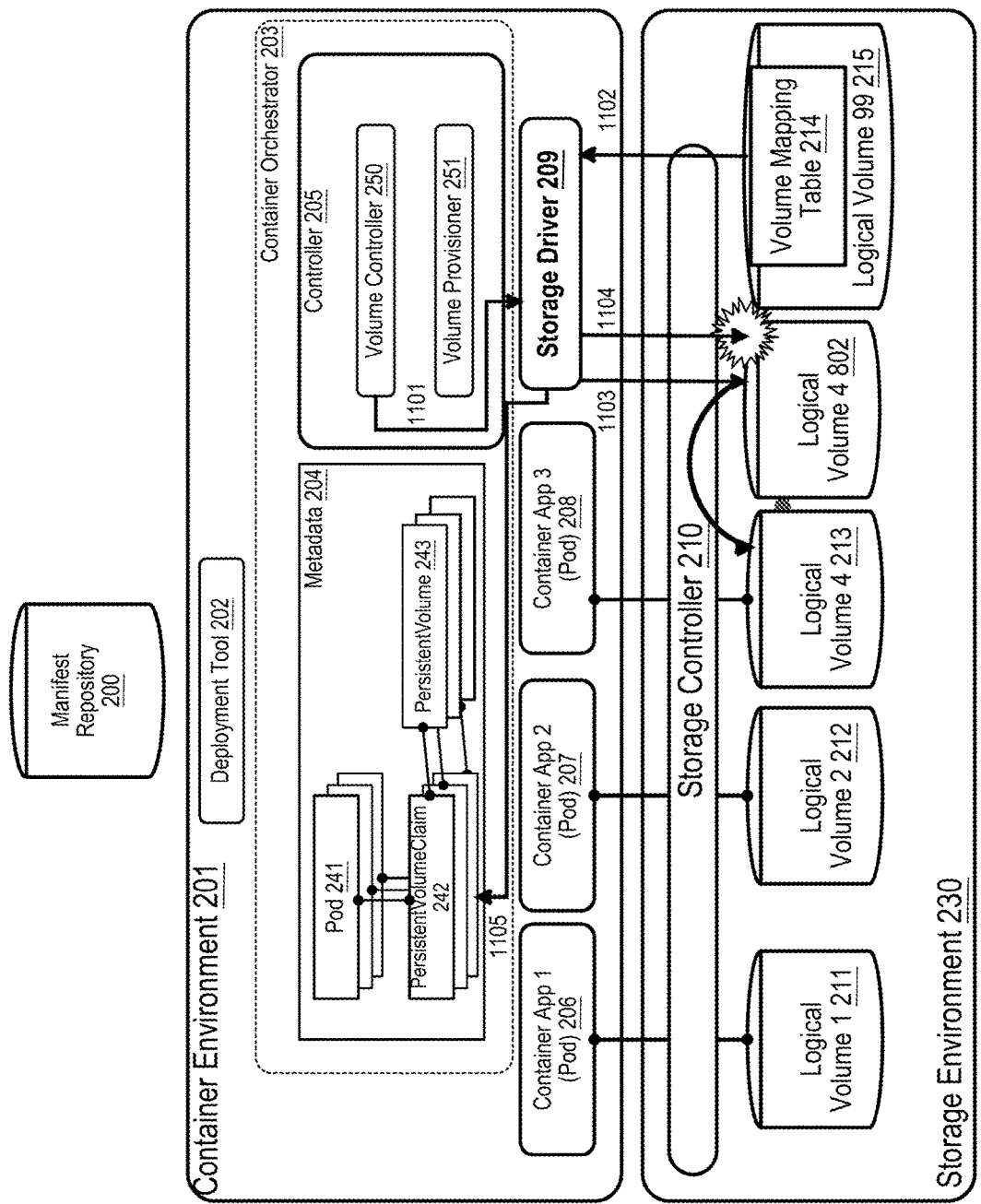
FIG. 11 illustrates the second half of an example of copying volume metadata, in accordance with an example implementation.

In a fifth aspect, CPUs 121 can execute the method or instructions of any of the preceding aspects, and further involve, for the volume provisioning function creating the new persistent volume metadata responsive to the retrieved persistent volume information, during a binding of a persistent volume claim to the new persistent volume metadata: executing a hook process to determine whether a corresponding data exists in the volume management information associated with the claim name from the persistent volume information; for a determination that the corresponding data exists, retrieving the associated logical volume identifier and the persistent volume information comprising persistent volume identifier and persistent volume attributes, from the volume management information; and copying volume metadata from a previous logical volume associated with a previous persistent volume metadata to the new logical volume as illustrated in FIG. 10 and FIG. 11.

Figure 12:
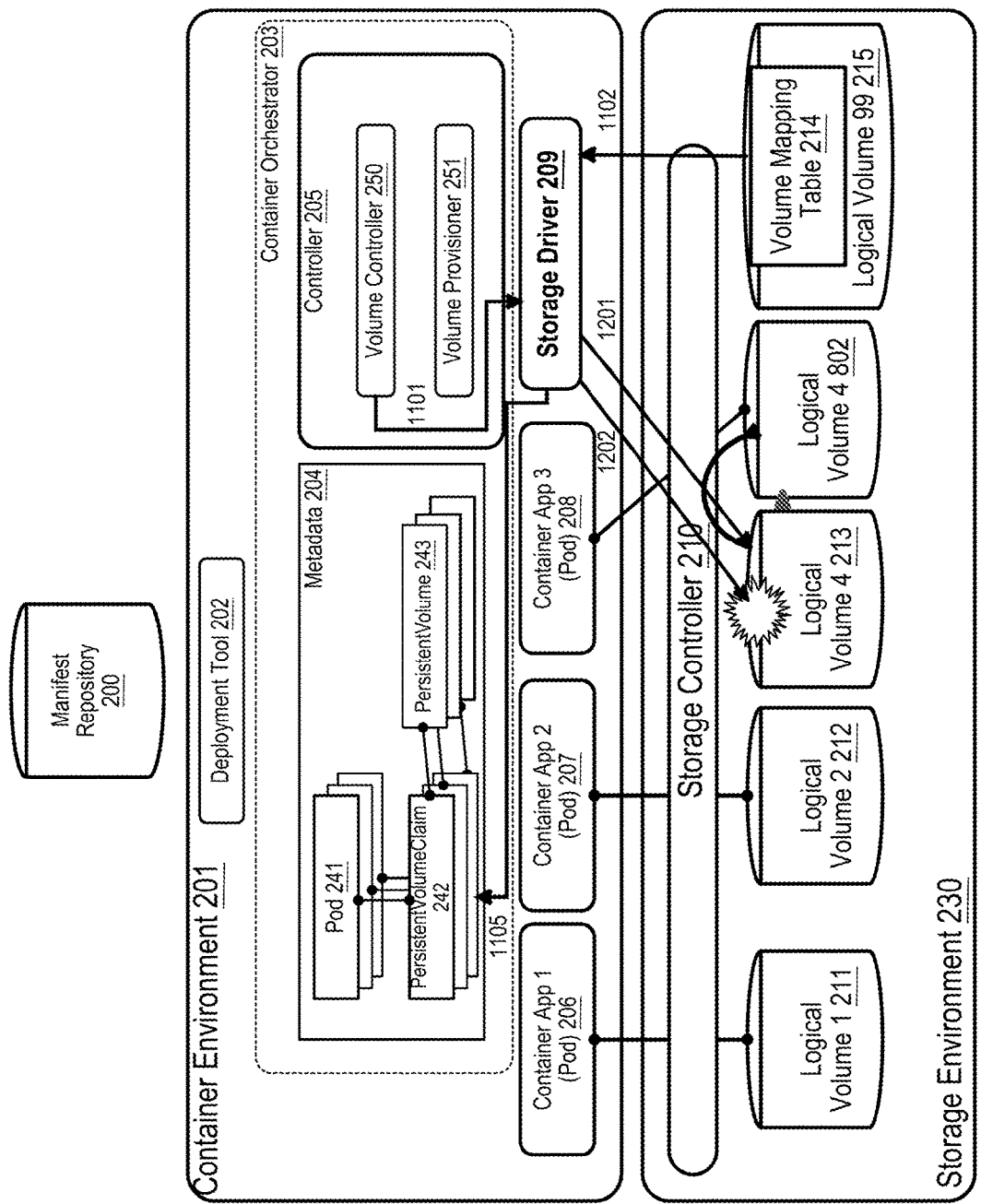
FIG. 12 illustrates the second half of an example of copying data, in accordance with an example implementation.

In a sixth aspect, CPUs 121 can execute the method or instructions of any of the preceding aspects, and further involve, for the volume provisioning function creating the new persistent volume metadata responsive to the retrieved persistent volume information, during a binding of a persistent volume claim to the new persistent volume metadata executing a hook process to determine whether a corresponding data exists in the volume management information associated with the claim name from the persistent volume information; for a determination that the corresponding data exists, retrieving the associated logical volume identifier and the persistent volume information comprising persistent volume identifier and persistent volume attributes, from the volume management information; and copying data from a previous logical volume associated with a previous persistent volume metadata to the new logical volume as illustrated in FIG. 10 and FIG. 12.

In a seventh aspect, any of the preceding aspects can be executed by a container orchestrator or a hypervisor. The present disclosure is not limited to container environments, and can be extended to virtual machine environments facilitate by hypervisor in accordance with the desired implementation.

Figure 13:
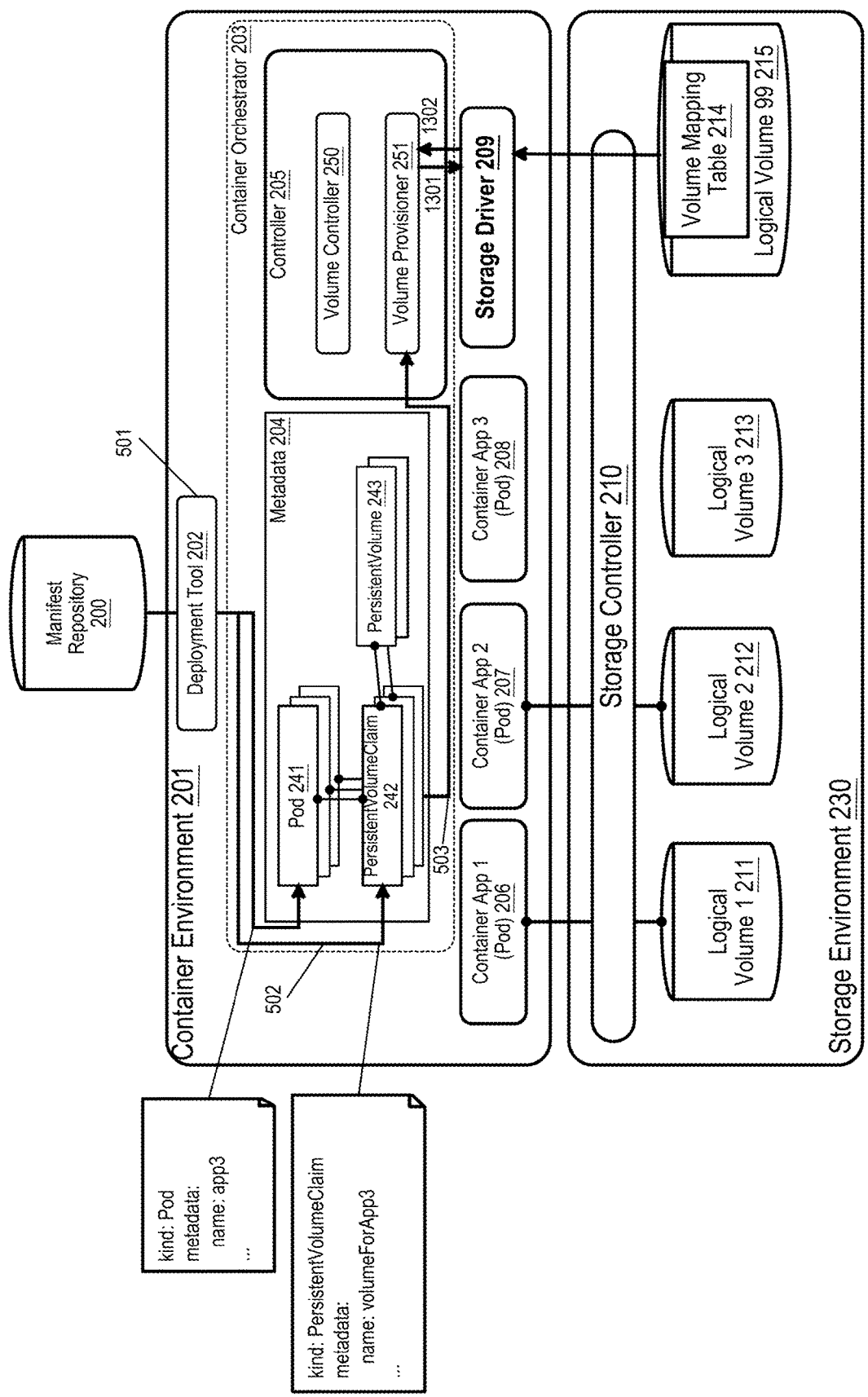
FIG. 13 illustrates the first half of an example of responding with tentative information, in accordance with an example implementation.

In an eighth aspect, CPUs 121 can execute a method or instructions involving managing volume management information that maps volume claim information with a logical volume identifier associated with persistent volume information; and for receipt of a request for a new volume: providing temporary persistent volume information to a volume provisioning function as illustrated in FIG. 13.

Figure 14:
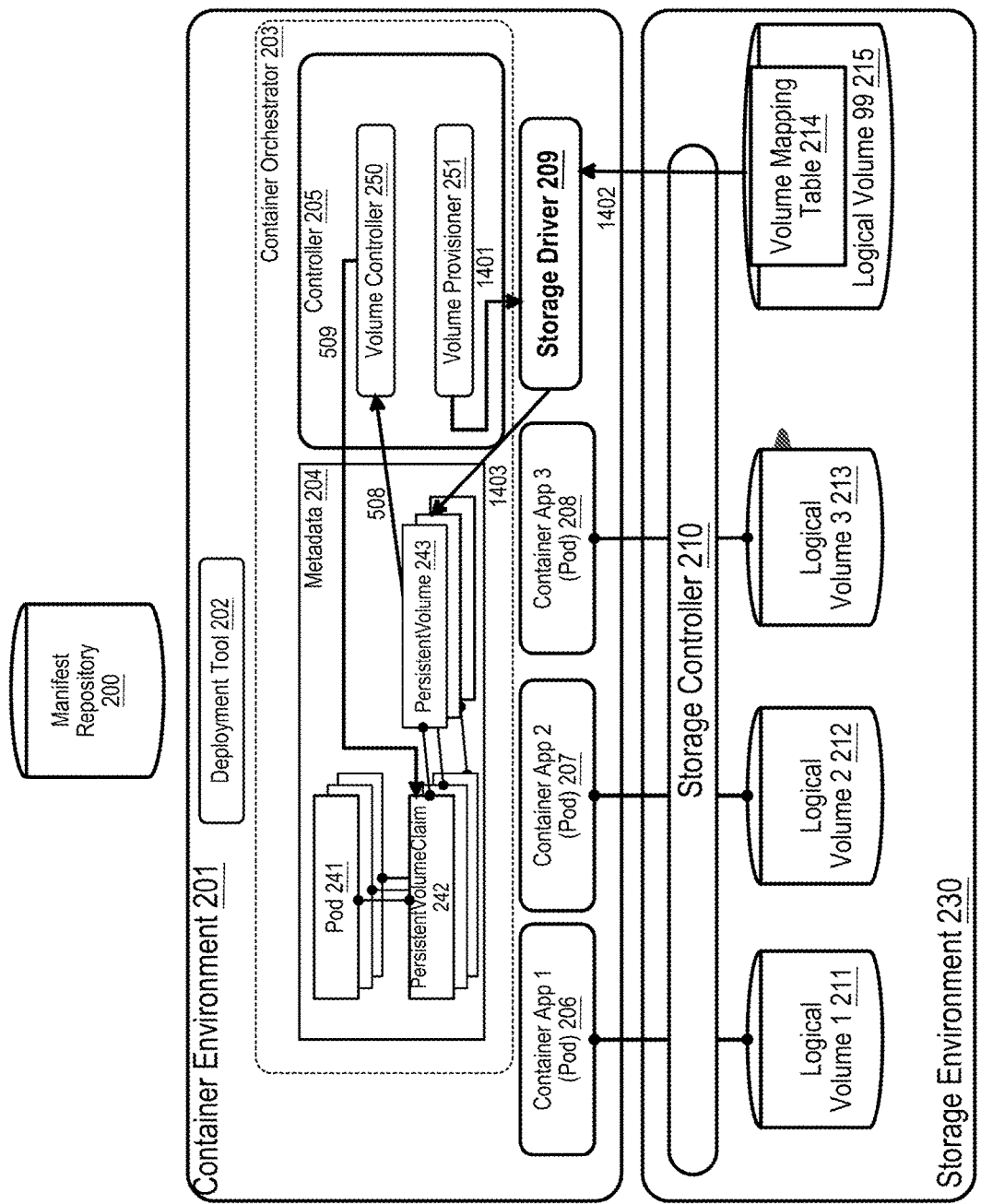
FIG. 14 illustrates the second half of an example of responding with tentative information, in accordance with an example implementation.

In a ninth aspect, CPUs 121 can execute the method or instructions of that of the eighth aspect, and further execute, for the volume provisioning function deploying a persistent volume metadata responsive to the retrieved logical volume identifier and the persistent volume information, during a binding of a persistent volume claim to the deployed persistent volume, referencing the volume management information to retrieve an associated logical volume identifier and the persistent volume information based on the volume claim information; and overwrite the persistent volume metadata attributes with the retrieved persistent volume attributes in the volume management information as illustrated in FIG. 13 and FIG. 14.

Figure 15:
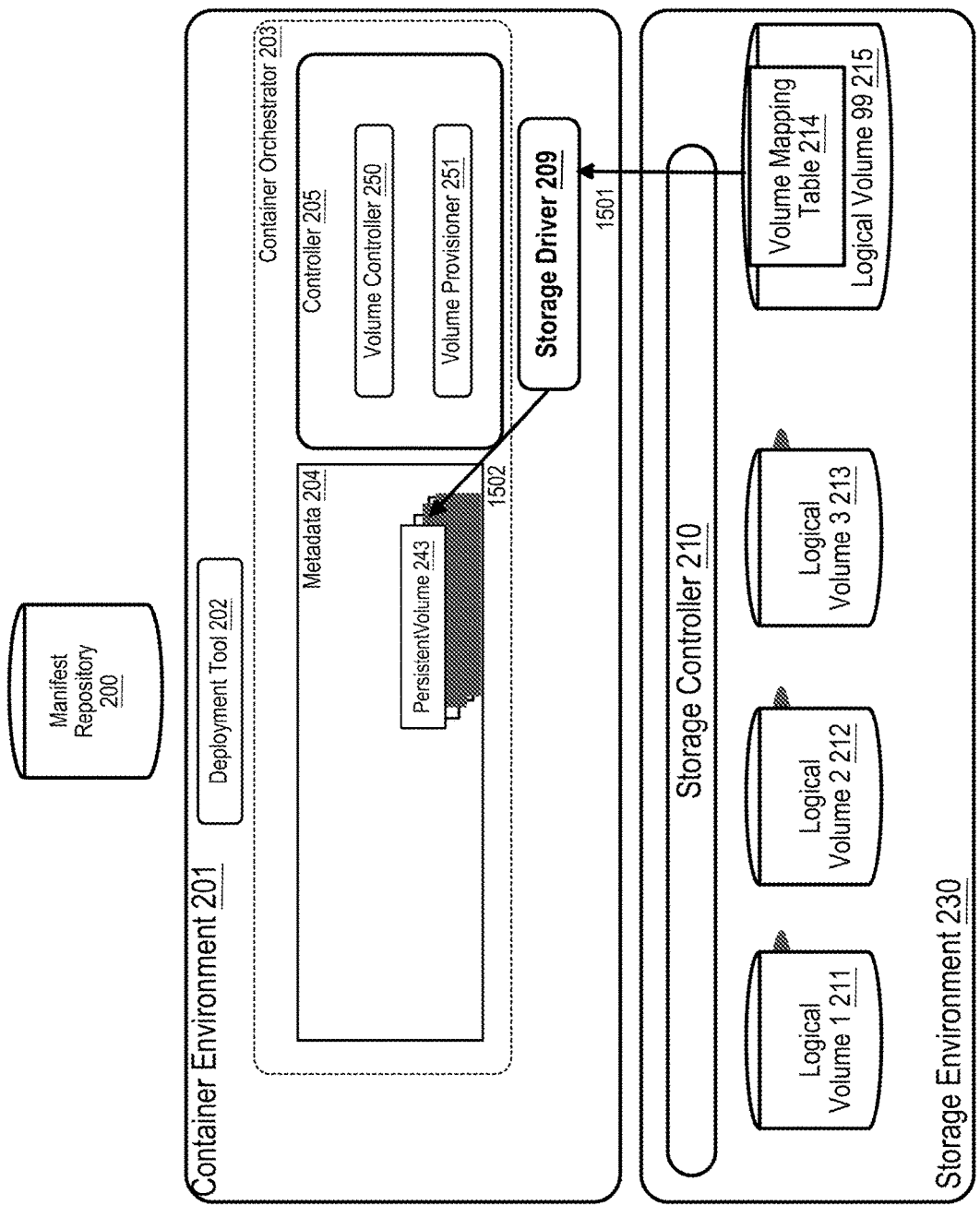
FIG. 15 illustrates the first half of an example of creating a PersistentVolume in advance, in accordance with an example implementation.
Figure 16:
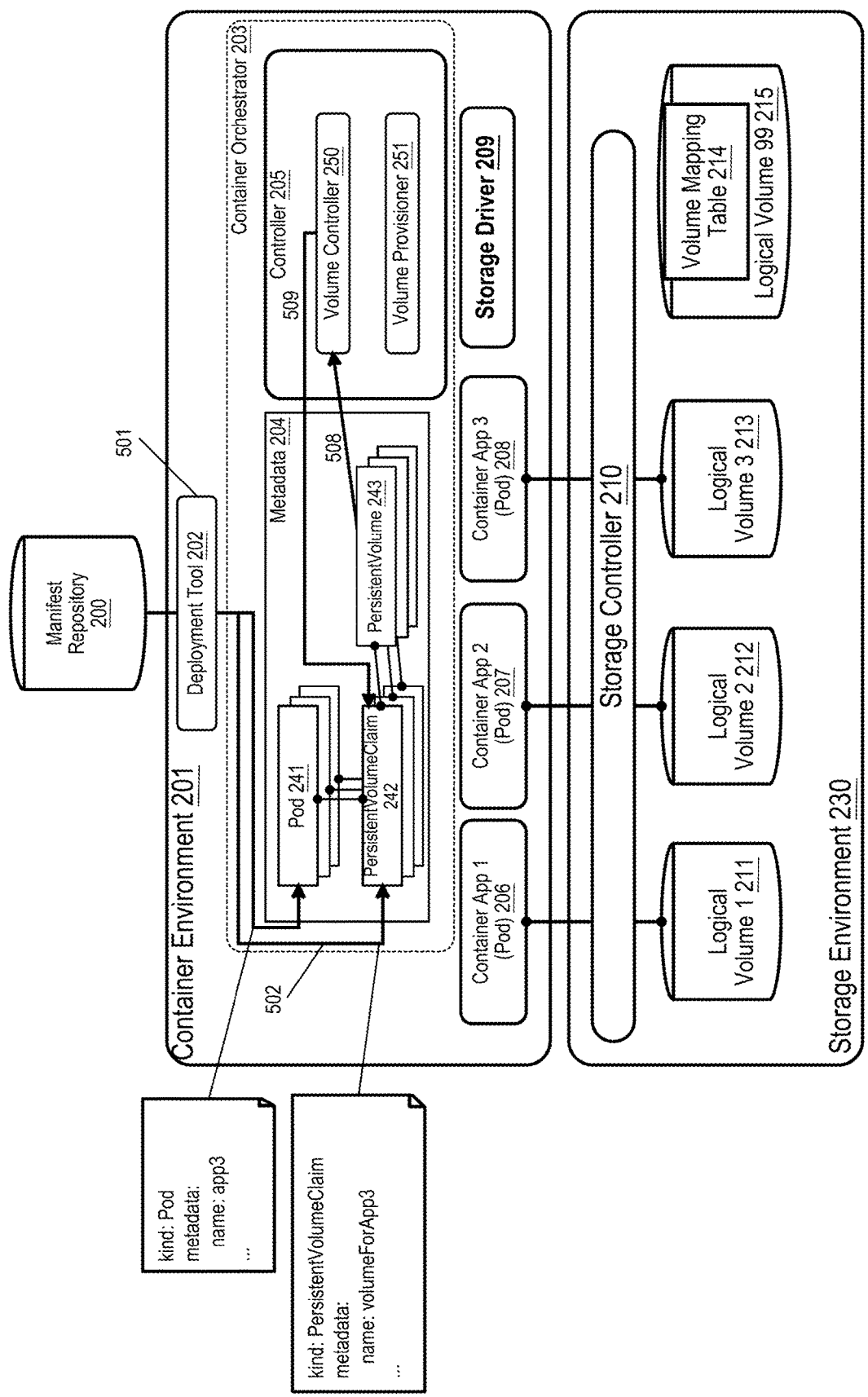
FIG. 16 illustrates the second half of an example of creating a PersistentVolume in advance, in accordance with an example implementation.

In a tenth aspect, CPUs 121 can execute the method or instructions involving managing volume management information that maps volume claim information with a logical volume identifier associated with persistent volume information; and generating a persistent volume metadata using the logical volume identifier and the persistent volume information in the volume management information prior to the receipt of a request for a new volume to facilitate implementations for pre-generating the persistent volume before the request is received. In this scenario, container orchestrator does not request a new volume and automatically binds persistent volume metadata with persistent volume claim as illustrated in FIG. 15 and FIG. 16.

In an eleventh aspect, any of the preceding aspects can be executed by one of a container orchestrator or a hypervisor.

FIG. 3 illustrates example details of orchestrator metadata 204 from FIG. 2, in accordance with an example implementation. A Pod 241 describes information of a container application and a volume used by the application. It includes a name of the pod, a name of the application container, an image of the application container, a name of the volume and a name of PersistentVolumeClaim.

A PersistentVolumeClaim 242 describes a volume claim specified by a user, including a name and capacity of the claim. It also includes a name of the Volume that it corresponds to, but this information is not specified by the user but automatically added by the volume controller.

A PersistentVolume 243 describes a provisioned volume information, including a name, capacity, driver to use, volume attributes and reference to the claim that the volume corresponds to. Each PersistentVolume metadata is created by the volume provisioner after the storage driver provisioned a corresponding volume to the storage environment.

FIG. 4 illustrates a Volume Mapping Table, in accordance with an example implementation. It is indexed by the name of a PersistentVolumeClaim shown in FIG. 3. The LV ID field shows an ID of the logical volume in which logical volume corresponds to the claim. The PV name and PV attributes fields show the name and the attributes of the logical volume in which PersistentVolume metadata corresponds to the claim.

FIG. 5 describes an overall procedure of an initial deployment of the container application 3 208 and corresponding volume using dynamic provisioning. In the manifest repository, Pod and PersistentVolumeClaim manifests for the container application 3 208 are placed by the user in advance. The procedure in the example of FIG. 5 is as follows.

At 501, the flow deploys the pod and PersistentVolumeClaim. The deployment tool 202 deploys the manifests for the Pod and PersistentVolumeClaim to the container orchestrator as a part of orchestrator metadata.

At 502, the flow detects the new PersistentVolume. The controller 210 of the container orchestrator deploys container applications in accordance with the Pod manifest. At the same time, the volume provisioner 251 detects the deployment of the new PersistentVolumeClaim.

At 503, the flow requests a new volume. The volume provisioner 251 requests a new volume to the storage driver 209 with the name of the PersistentVolumeClaim.

At 504, the flow checks the Volume Mapping Table 214. The storage driver 209 refers to the volume mapping table 214 and checks if there is a row corresponding to the PersistentVolumeClaim. In this case, as this is the initial deployment, there is no information for the PersistentVolumeClaim.

At 505, the flow creates a new Logical Volume and updates Volume Mapping Table 214. The storage driver 209 creates a new logical volume to the storage environment 230 and inserts a new row that corresponds to the new volume to the volume mapping table 214.

At 506, the flow responds with the volume information. The storage driver 209 responds to the volume provisioner 251 with the volume attributes.

At 507, the flow deploys the PersistentVolume with the corresponding volume attributes. The volume provisioner 251 deploys a new PersistentVolume metadata 243 with the volume attributes to the container orchestrator.

At 508, the flow detects the new PersistentVolume. The volume controller 250 detects the deployment of the new PersistentVolume 243 and updates a volume name field in the corresponding PersistentVolumeClaim 242.

At 509, the flow updates the PersistentVolumeClaim 242 to map to the PersistentVolume.

Figure 6:
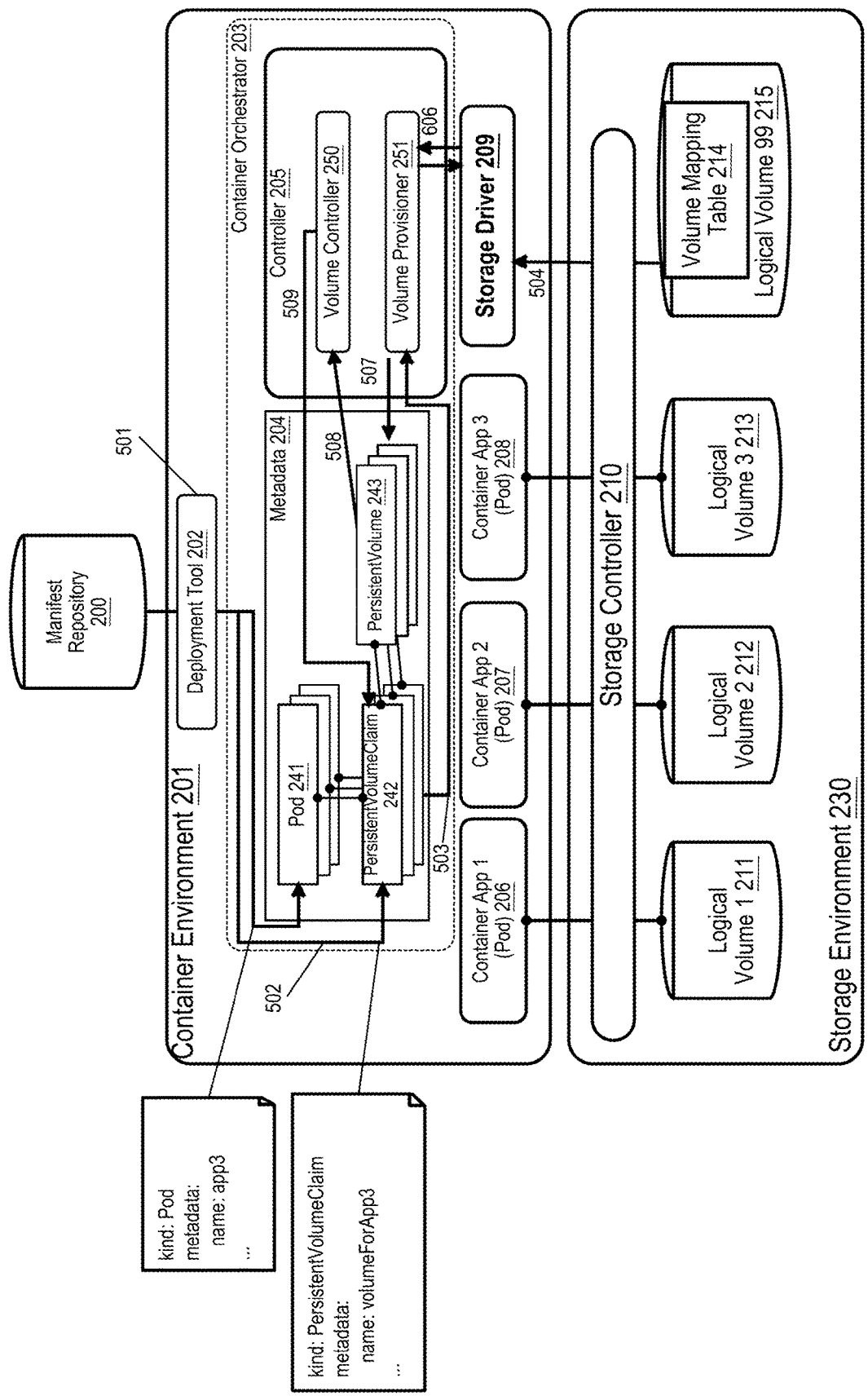
FIG. 6 illustrates an overall procedure of the restoration of the application and the corresponding volume, in accordance with an example implementation.

FIG. 6 illustrates an overall procedure of the restoration of the application and the corresponding volume, in accordance with an example implementation. As with FIG. 5, the figure shows the deployment of the container application 3 208. The flow of FIG. 6 is similar to the flow of the initial deployment as illustrated in FIG. 5, but the difference is the operation of the storage driver 209. As the logical volume 3 already exists in the storage environment 230, when the storage driver 209 checks the volume mapping table at 504, it finds that there is the row corresponding to the requested PersistentVolumeClaim. To restore the volume, the storage driver 209 behaves as if it has created a new volume and returns the volume information 606 in the volume mapping table 214. Thus, the logical volume 3 that is created using dynamic provisioning can be restored without changing the manifests or behavior of the container orchestrator.

FIG. 7 illustrates a flowchart when the storage driver is requested a new volume from the volume provisioner, in accordance with an example implementation. Once the request for a new volume is received at 700, the flow first refers to the volume mapping table in the storage environment at 701 and checks if the row corresponding to the PersistentVolumeClaim exists at 702. If the row is found (Yes), then the flow proceeds to 703 and retrieves the logical volume ID, the volume name and the volume attributes. If the row is not found (No), it requests the storage controller to create a new logical volume 705, receives a logical volume ID in response to the request 706 and creates a new volume name 707. Then, the storage driver adds a new row to the volume mapping table corresponding to the PersistentVolumeClaim using the name of the claim, the logical volume ID, the created volume ID and the attributes of the volume at 708. The storage driver then responds to the volume provisioner with volume information including volume ID and attributes at 704.

In example implementations, the existing reference information is provided as a response to the volume creation request as illustrated in FIGS. 5 to 7. Other variations are also possible in accordance with the desired implementation, and the present disclosure is not limited thereto. For example, the procedures can involve creating a new volume at the time of receiving the volume creation request. During the creation of the PersistentVolume or the binding of the PersistentVolumeClaim and PersistentVolume, the storage driver 209 hooks the process and can overwrite PersistentVolume information, copy volume metadata, or copy data, depending on the desired implementation.

In other variations, the storage driver 209 can also be configured to not create a volume when receiving a volume creation request and respond with tentative information instead. During the creation of the PersistentVolume, the storage driver 209 hook the process and can overwrite PersistentVolume information. In another variation, the storage driver 209 can also create a PersistentVolume in advance.

FIG. 8 illustrates the first half of an example of overwriting PersistentVolume information, in accordance with an example implementation. As with FIG. 5, the figure shows the deployment of the container application 3 208. In this example implementation, when the volume provisioner 251 requests a new volume to the storage driver 209, the storage driver 209 creates a new Logical Volume regardless of whether the Logical Volume 802 corresponding to the PersistentVolumeClaim exists or not at 801.

FIG. 9 illustrates the second half of an example of overwriting PersistentVolume information, in accordance with an example implementation. During the creation of the PersistentVolume, there can be a hook feature 901 to hook the procedure. If there is a hook procedure, e.g. in the storage driver 209, at 902, the storage driver 209 refers to the volume mapping table 214 and checks if there is a row corresponding to the PersistentVolumeClaim. When it finds that there is the row corresponding to the requested PersistentVolumeClaim, the storage driver 209 overwrites the PersistentVolume information and deploy the PersistentVolume at 903. At 904, if the newly created volume is not actually needed, then it can be deleted as illustrated in FIG. 9.

FIG. 10 illustrates the first half of examples of copying volume metadata and copying data, in accordance with example implementations. As with FIG. 5, the figure shows the deployment of the container application 3 208. In these example implementations, as with FIG. 8, when the volume provisioner 251 requests a new volume to the storage driver 209, the storage driver 209 creates a new Logical Volume regardless of whether the Logical Volume corresponding to the PersistentVolumeClaim exists or not at 801. The example implementations, however, do not hook the procedure of the creation of the PersistentVolume as FIG. 9.

FIG. 11 illustrates the second half of an example of copying volume metadata, in accordance with an example implementation. During the update of the PersistentVolumeClaim, there can be a hook feature 1101 to hook the procedure. If there is a hook procedure, e.g. in the storage driver 209, at 1102, the storage driver 209 refers to the volume mapping table 214 and checks if there is a row corresponding to the PersistentVolumeClaim. When it finds that there is the row corresponding to the requested PersistentVolumeClaim, at 1103, the storage driver 209 copies the metadata from the Logical Volume 4 to the Logical Volume 3. At 1104, the newly created volume is deleted. Then, at 1105, the procedure updates the PersistentVolumeClaim 242 to map to the PersistentVolume.

FIG. 12 illustrates the second half of an example of copying data, in accordance with an example implementation. As with FIG. 11, there can be a feature 1101 to hook the procedure and a feature to refer the volume mapping table 214, e.g. in the storage driver 209, as illustrated in 1101 and 1102. When the storage driver 209 finds that there is the row corresponding to the requested PersistentVolumeClaim, at 1201, the storage driver 209 copies the data from the Logical Volume 3 to the Logical Volume 4. At 1202, the old volume is deleted as illustrated in FIG. 12. Then, at 1105, the procedure updates the PersistentVolumeClaim 242 to map to the PersistentVolume.

FIG. 13 illustrates the first half of an example of responding with tentative information, in accordance with an example implementation. As with FIG. 5, the figure shows the deployment of the container application 3 208. In this example implementation, when the volume provisioner 251 requests a new volume to the storage driver 209 at 1301, the storage driver 209 can respond with tentative information and does not map the PVC to any actual volume in storage at that moment at 1302.

FIG. 14 illustrates the second half of an example of responding with tentative information, in accordance with an example implementation. As with FIG. 9, during the creation of the PersistentVolume, there can be a hook feature 1401 to hook the procedure. If there is a hook procedure, e.g. in the storage driver 209, at 1402, the storage driver 209 refers to the volume mapping table 214 and checks if there is a row corresponding to the PersistentVolumeClaim. When it finds that there is the row corresponding to the requested PersistentVolumeClaim, the storage driver 209 overwrites the PersistentVolume information and deploy the PersistentVolume at 1403.

FIG. 15 illustrates the first half of an example of creating a PersistentVolume in advance, in accordance with an example implementation. Before the PVCs are deployed, at 1501, the storage driver 209 refers to the volume mapping table 214. Then, at 1502, the storage driver 209 automatically create the participating volume in advance.

FIG. 16 illustrates the second half of an example of creating a PersistentVolume in advance, in accordance with an example implementation. In the example implementation, when the PVC is deployed after the PV is deployed, the volume controller can find that data as there is already a participant volume in the container environment. The volume controller can map the newly deployed PVC and already deployed PV accordingly.

Example implementations described herein allows the restoration of relationships between volumes and container applications in a planned outage or failure of a container orchestration environment automatically. As a result, users can operate planned outages or recovery from failure of a container environment with storage systems easily, without changing the existing operational environment using declarative IaC or GitOps. In addition, it can be applied to a disaster recovery situation, where the storage system replicates volumes continuously from a main site to a disaster recovery site, and container applications are deployed to the disaster recovery (DR) site from the manifest repository when a disaster occurs. Moreover, the example implementations described herein is not limited to container environments but may also be used in other environments such as virtual machine (VM) environments.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method, comprising:
managing volume management information that maps volume claim information with a logical volume identifier associated with persistent volume information; and
for receipt of a request for a new volume:
referencing the volume management information to retrieve an associated logical volume identifier and the persistent volume information based on volume claim information associated with the request; and
providing the retrieved persistent volume information to a volume provisioning function,
wherein the referencing the volume management information to retrieve the associated logical volume identifier and the persistent volume information based on the volume claim information associated with the request comprises:
determining whether a corresponding data exists in the volume management information associated with a claim name from the persistent volume information;
for a determination that the corresponding data exists, retrieving the associated persistent volume information comprising persistent volume identifier and persistent volume attributes, from the volume management information.

2. The method of claim 1, wherein
for a determination that the corresponding data does not exist:
creating a new logical volume with a new logical volume identifier;
creating a new persistent volume identifier based on the new logical volume and the new logical volume identifier; and
adding a new data to the volume management information comprising the new logical volume identifier.

3. The method of claim 1, further comprising, for the volume provisioning function creating new persistent volume metadata responsive to the retrieved persistent volume information:
during a deployment of the new persistent volume metadata:
executing a hook process to determine whether a corresponding data exists in the volume management information associated with a claim name from the persistent volume information;
for a determination that the corresponding data exists, retrieving the associated logical volume identifier and the persistent volume information comprising persistent volume identifier and persistent volume attributes, from the volume management information; and
overwriting persistent volume metadata attributes with the retrieved persistent volume attributes in the volume management information.

4. The method of claim 1, further comprising, for the volume provisioning function creating new persistent volume metadata responsive to the retrieved persistent volume information:
during a binding of a persistent volume claim to the new persistent volume metadata:
executing a hook process to determine whether a corresponding data exists in the volume management information associated with a claim name from the persistent volume information;
for a determination that the corresponding data exists, retrieving the associated logical volume identifier and the persistent volume information comprising persistent volume identifier and persistent volume attributes, from the volume management information;
copying volume metadata from a previous logical volume associated with a previous persistent volume metadata to a new logical volume.

5. The method of claim 1, further comprising, for the volume provisioning function creating new persistent volume metadata responsive to the retrieved persistent volume information:
during a binding of a persistent volume claim to the new persistent volume metadata:
executing a hook process to determine whether a corresponding data exists in the volume management information associated with a claim name from the persistent volume information;
for a determination that the corresponding data exists, retrieving the associated logical volume identifier and the persistent volume information comprising persistent volume identifier and persistent volume attributes, from the volume management information; and
copying data from a previous logical volume associated with a previous persistent volume metadata to a new logical volume.

6. The method of claim 1, wherein the method is executed by one of a container orchestrator or a hypervisor.

7. A method, comprising:
managing volume management information that maps volume claim information with a logical volume identifier associated with persistent volume information;
for receipt of a request for a new volume:
providing temporary persistent volume information to a volume provisioning function, and
for the volume provisioning function deploying a persistent volume metadata responsive to the logical volume identifier and the persistent volume information:
during a deployment of a persistent volume;
referencing the volume management information to retrieve an associated logical volume identifier and the persistent volume information based on the volume claim information; and
overwrite persistent volume metadata attributes with retrieved persistent volume attributes in the volume management information.

8. A method, comprising:
managing volume management information that maps volume claim information with a logical volume identifier associated with persistent volume information;
generating a persistent volume metadata using the logical volume identifier and the persistent volume information in the volume management information prior to receipt of a request for a new volume, and performing automatic binding of a persistent volume claim to the persistent volume metadata.

9. The method of claim 8, wherein the method is executed by one of a container orchestrator or a hypervisor.

\* \* \* \* \*